(12) United States Patent
Birger et al.

(10) Patent No.: US 11,580,725 B2
(45) Date of Patent: Feb. 14, 2023

(54) SYSTEMS, DEVICES AND METHODS FOR IMAGING OBJECTS WITHIN OR BEHIND A MEDIUM USING ELECTROMAGNETIC ARRAY

(71) Applicant: VAYYAR IMAGING LTD., Yehud (IL)

(72) Inventors: Matan Birger, Kefar Malal (IL); Yuval Shamuel Lomnitz, Hertsliya (IL); Tanya Chernyakova, Tel Aviv-Jaffa (IL)

(73) Assignee: VAYYAR IMAGING LTD., Yehud (IL)

( * ) Notice: Subject to any disclaimer, the term of this patent is extended or adjusted under 35 U.S.C. 154(b) by 29 days.

(21) Appl. No.: 17/085,106

(22) Filed: Oct. 30, 2020

(65) Prior Publication Data

US 2021/0133445 A1 May 6, 2021

Related U.S. Application Data

(60) Provisional application No. 62/928,552, filed on Oct. 31, 2019.

(51) Int. Cl.
*G01S 13/88* (2006.01)
*G06V 20/10* (2022.01)
*H04N 5/30* (2006.01)

(52) U.S. Cl.
CPC .............. *G06V 20/10* (2022.01); *H04N 5/30* (2013.01)

(58) Field of Classification Search
CPC ........ G01S 13/888; G01S 13/89; G06V 20/10
See application file for complete search history.

(56) References Cited

U.S. PATENT DOCUMENTS

| | | | |
|---|---|---|---|
| 2011/0025546 A1* | 2/2011 | Cook | G01S 13/536 342/162 |
| 2011/0050479 A1* | 3/2011 | Mohamadi | G01S 13/888 342/179 |
| 2015/0146955 A1* | 5/2015 | Dong | G06T 11/008 382/131 |
| 2015/0355314 A1* | 12/2015 | Handa | G01S 3/74 342/22 |
| 2017/0146651 A1* | 5/2017 | Liu | G01S 13/89 |
| 2018/0172820 A1* | 6/2018 | Rhead | G01S 13/888 |
| 2018/0239013 A1* | 8/2018 | Lande | G01S 13/904 |
| 2018/0299394 A1* | 10/2018 | Lomnitz | G01N 22/02 |
| 2021/0405182 A1* | 12/2021 | Reynolds | G01S 13/887 |

* cited by examiner

*Primary Examiner* — Brian T Pendleton
*Assistant Examiner* — Frank Johnson
(74) *Attorney, Agent, or Firm* — Browdy and Neimark, PLLC

(57) ABSTRACT

Systems, device, and methods are provided for imaging at least one target object within a medium, including acquiring multiple sets of RF signals and generating plurality of DAS images and analyzing the plurality of DAS images to detect one or more target object in the plurality of DAS images and further visualizing the at least one target object.

18 Claims, 11 Drawing Sheets

SYSTEMS, DEVICES AND METHODS FOR IMAGING OBJECTS WITHIN OR BEHIND A MEDIUM USING ELECTROMAGNETIC ARRAY

CROSS-REFERENCE

The present application claims the benefit of U.S. Provisional Application Ser. No. 62/928,552, filed on Oct. 31, 2019, entitled "SYSTEMS, DEVICES AND METHODS FOR IMAGING OBJECTS WITHIN OR BEHIND A MEDIUM USING ELECTROMAGNETIC ARRAY", the entire disclosures of which are incorporated herein by reference.

FIELD OF THE INVENTION

The present invention relates to systems, devices and methods for imaging objects or substances embedded within a medium and more specifically, but not exclusively, to RF (Radio Frequency) imaging systems, devices and methods for imaging objects or substances embedded within a medium or behind a medium such as one or more walls.

BACKGROUND OF THE INVENTION

Radio Frequency (RF) technology use to provide advanced detection capabilities is known for more than a century. The first patent for a system designed to use continuous-wave radar to locate buried objects was submitted by Gotthelf Leimbach and Heinrich Löwy in 1910, six years after the first patent for radar itself (patent DE 237 944).

Today, various devices and methods use GPR (Ground Penetrating Radar) or DAS (Delay and Sum) solutions for sensing or imaging subsurface elements such as sensing objects or elements covered or surrounded in a medium. These methods use electromagnetic radiation in the microwave band (UHF/VHF frequencies) of the radio spectrum, to detect the reflected signals from subsurface structures.

However, the data provided by prior imaging devices of hidden objects is poor and can be less than ideal in at least some instances. For example, although prior sensing devices such as radar sensing devices can provide general data of the location of hidden objects the data may be of little significance to at least some users as it doesn't include an accurate image and location of the hidden targets. Additionally, prior sensing devices sometimes provide false detection results which include for example identifying objects in the medium, such as a wall, as targets while these objects are actually portions of the imaged wall and not targets. Moreover, while for some type of walls prior imaging devices provide a clear image of the walls' inner sections for other types of walls these imaging devices provide a distorted view including unclear visual images of the walls which may not be used to identify targets within the wall.

Many other examples exist where radar devices do not adequately convey relevant parameters of an object covered, embedded or surrounded by a medium, and it would be helpful to provide an accurate image of the object to a user.

One of the reasons for such distorted views of walls and objects within the walls is the structure and content of some walls. Homogenous walls such as gypsum walls defer from inhomogeneous walls such as lath & plaster walls not only by their material content but also by their electromagnetic characteristics. For example, while RF signals are reflected substantially equally from each point of the homogenous wall forming, for example, clear DAS images of the homogenous wall, RF signals are reflected unequally from each point or some points of the inhomogeneous wall forming distorted DAS images of the inhomogeneous wall. These distorted images typically include reverberations and trails of signals which obviously may not be used to identify the structure of the inhomogeneous wall, hence detect objects within or behind the walls.

In light of the above, an improved imaging devices, systems and methods that overcome at least some of the above-mentioned deficiencies of the prior devices would be beneficial. Ideally, such imaging devices and systems would be a compact, integrated with a consumer device such as a cellular telephone, sufficiently rugged and low in cost to be practical for end-user measurements of well-hidden items, convenient to use.

SUMMARY OF THE INVENTION

Prior to the summary of the invention being set forth, it may be helpful to set forth definitions of certain terms that will be used hereinafter.

The term 'target' or 'target object' or 'object' as used herein is defined as an object located or embedded (e.g. hidden) within an object or medium and/or behind the object or medium such as an opaque object made of wood.

The term 'parameter' as used herein with reference to the target or object is defined as a value such as a numerical value associated with the target or object, for example, the parameters associated with a pipe may be: location, orientation, radius, dielectric constant, etc. Different objects may have a different set of parameters.

In accordance with a first embodiment there is provided a method for imaging at least one target object within a non-homogeneous medium, the method comprising: acquiring multiple sets of RF signals from multiple transmit antennas; converting each set of RF signals of said multiple sets of RF signals into a DAS (Delay and Sum) image of the non-homogeneous medium using a DAS processing method to yield plurality of DAS images; analyzing the plurality of DAS images to detect the at least one target in said plurality of DAS images, said analysis comprising: evaluating a plurality of energy values of the plurality of DAS images; and normalizing the plurality of DAS images by the energy of one DAS image of the plurality of DAS images, said DAS image having maximum energy; and analyzing said normalized plurality of DAS images to yield one or more energy threshold values; analyzing said plurality of DAS images to detect one or more images comprising an energy level lower than said one or more energy threshold value; and identifying said detected one or more images as images of said at least one target object; and visualizing said at least one target object.

In an embodiment, the method comprises stitching the plurality of DAS images to yield a composite image; and analyzing the composite image to detect the at least one target in said composite image.

In an embodiment, the method comprising displaying said one or more images on a display.

In an embodiment, the one or more images are 2D (two dimensional) or 3D (there dimensional).

In an embodiment, the non-homogeneous medium is made of at least two substances, each of said at least two substances are selected from the group consisting of: plaster, stone, concrete, gypsum, iron, plastic wood, glass, plastic, lath, gypsum, aluminum, iron, stone, air, or combinations thereof.

In an embodiment, the non-homogeneous medium is a wall.

In an embodiment, the non-homogeneous wall is a lath and plaster wall.

In an embodiment, the method comprising displaying said at least one target object.

In an embodiment, the multiple sets of RF signals are acquired from an RF sensing device.

In accordance with a second embodiment there is provided an RF (Radio Frequency) device, the device comprising: an RF array, the RF array comprises at least two transducers, wherein at least one of said at least two transducers is configured to transmit an RF signal towards at least one object embedded in a non-homogeneous medium, and at least one transceiver attached to said at least two transducers, the at least one transceiver is configured to transmit at least one RF signal toward the at least one object and receive multiple sets of RF signals affected or reflected by the at least one object or the non-homogeneous medium while the RF array is moved in proximity to the non-homogeneous medium; a data acquisition unit configured to receive and store said multiple sets of affected RF signals; and at least one processor said at least one processor is configured to: convert each set of RF signals of said multiple sets of RF signals into a DAS (Delay and Sum) image of the non-homogeneous medium using a DAS processing method to yield plurality of DAS images; analyze the plurality of DAS images to detect at least one target object in said plurality of DAS images, said analysis comprising: evaluating a plurality of energy values of the plurality of DAS images; and normalizing the plurality of DAS images by the energy of one DAS image of the plurality of DAS images, said DAS image having maximum energy; and analyzing said normalized plurality of DAS images to yield one or more energy threshold values; and analyzing said plurality of DAS images to detect one or more images comprising an energy level lower than said one or more energy threshold value; and identifying said detected one or more images as images of said at least one target object; visualize said at least one target object.

In an embodiment, the RF device comprising a display unit for displaying the image of said at least one object.

In an embodiment, the at least one object shape is selected from the group consisting of: an elongated object, a plane layer, a single point.

In an embodiment, the at least one object or the medium are made of one or more of: plaster, stone, concrete, gypsum, iron, plastic wood, glass, plastic, gypsum, aluminum, iron, stone, air, or combinations thereof.

In an embodiment, the RF device is configured to be in communication with a mobile device comprising the at least one processor and wireless communication circuitry to couple to the device, the at least one processor comprising instructions to receive data on said at least one target object and display the image of said at least one target object.

In an embodiment, the at least one processor unit and said display are located in said mobile device.

In an embodiment, the each transducer of the at least two transducers is an RF antenna.

In an embodiment, the array is a Radio Frequency (RF) array and the at least two transducers are RF antennas configured to transmit the RF signals.

In an embodiment, the multiple sets of RF signals are selected from the group comprising of: pulses signals; stepped/swept frequency signals.

In an embodiment, the plurality of signals bandwidth is within the UWB (3-10 Ghz) range or signals in the range between 1 Ghz and 100 Ghz.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION OF THE INVENTION

Figure 1A:
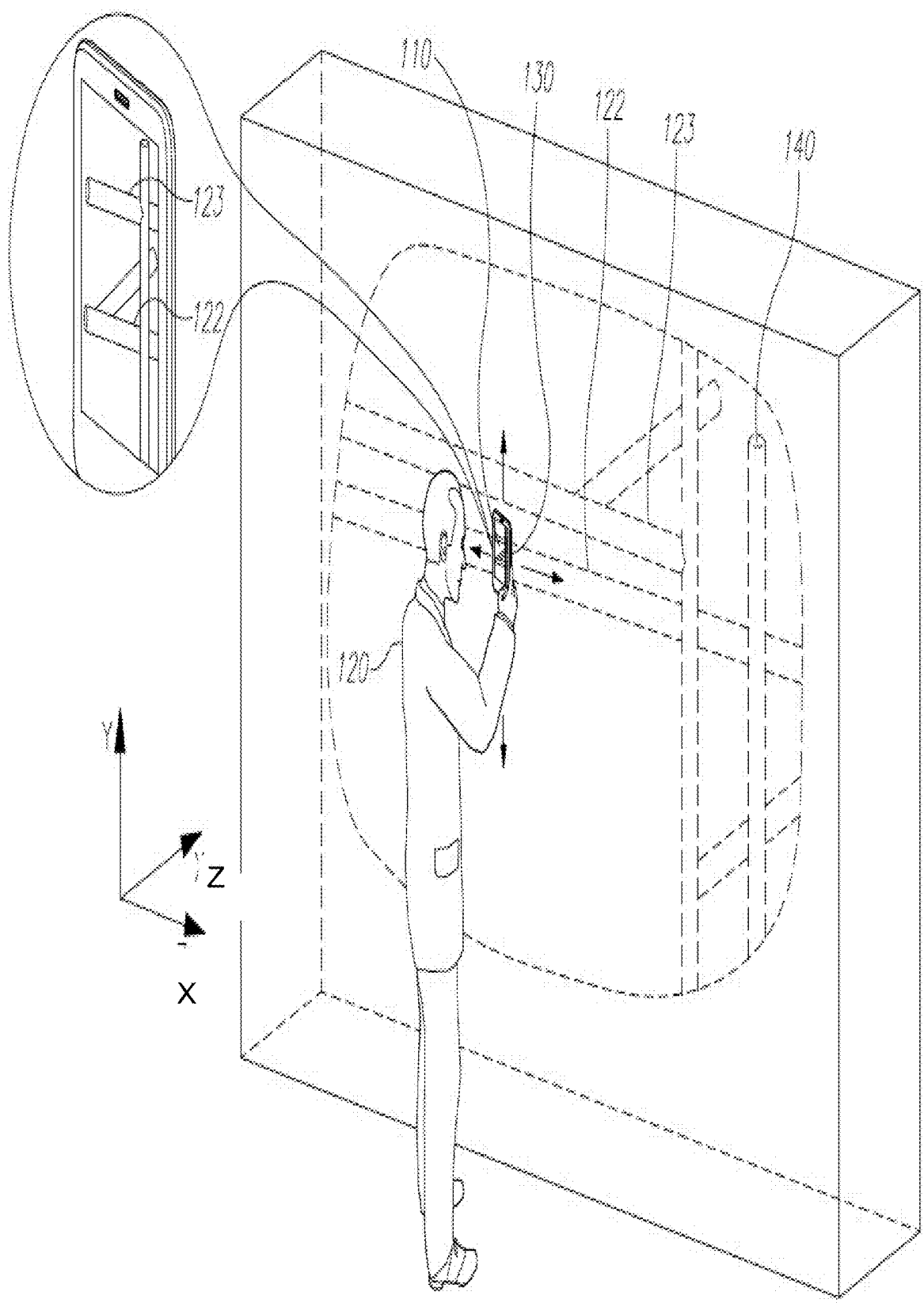
FIG. 1A is a simplified schematic diagram illustrating a user scanning the surface of a medium such as a wall by a mobile device, according to an embodiment of the invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

The present invention relates to systems, devices and methods for imaging objects or substances embedded within a medium and more specifically, but not exclusively, to RF (Radio Frequency) imaging systems, devices and methods for detecting and/or identifying and/or imaging objects or substances embedded within or behind a medium such as a non-homogeneous wall.

In other words, there are provided methods, devices and systems for "seeing" into walls, and such as non-homogeneous walls and providing users with the location of, for example, studs, stud center, plumbing pipes, electric wires, and even movement behind the walls to help find for example pests. The devices and systems, in accordance with embodiments, may act as a window into the user's walls, showing the user what's hidden from view. For example, if the user wants to hang a TV, he can use devices and systems of the present invention to see where the studs, the wires, and the pipes are and drill with confidence!

Specifically, in accordance with embodiments, there are provided systems, devices and methods configured to provide advanced detection and/or identification capabilities. In some embodiments, the devices and systems may be paired with a mobile device such as a mobile communication device for example a mobile phone to produce a visual image of what is inside and/or behind a medium such as concrete and drywall up to 10 cm, 15 cm, 20 cm deep and more. It can show users what is in or behind their wall in multiple modes (Pan mode (i.e. panoramic mode), Image mode, and Expert mode).

In accordance with embodiments, the devices, systems and methods may detect metal objects, wood studs, wires, pipes in nonuniform mediums and may also show movement behind these nonuniform mediums. The systems and devices may be used by contractors, electricians, plumbers, carpenters, and those in need of advanced wall imaging capabilities. The advanced technology is also perfect for ambitious DIYers and those who want real-time visual images of what is hidden within a wall.

More specifically, there are provided systems, devices and methods for detecting and/or imaging (e.g. 2D imaging or 3D imaging, panoramic imaging) one or more target objects (e.g. hidden targets) covered or surrounded by a non-homogeneous medium or non-homogeneous object. In some cases, the non-homogeneous medium may be a solid object such as a wall made of two or more materials such as lath and plaster. In some cases, the one or more target objects may be hidden pipes or miniaturized elements such as metal objects, wood studs, wires, etc.

In accordance with some embodiments, the device comprises an RF sensor configured to transmit and receive RF signals (e.g. multiple sets of RF signals) which penetrate through one or more mediums and one or more target objects within the one or more mediums (e.g. different types of objects or non-homogeneous medium), one or more processors configured to receive the multiple sets of RF signals affected or reflected from the target objects and/or the medium or elements surrounding the target objects and process the multiple RF signals to provide multiple DAS images of the medium and the hidden objects within or behind the medium and analyze the multiple images to detect and/or image the target objects.

In some cases, the one or more processors are configured to visualize the detected target objects and/or the medium structure. The visualization may be or may include a graphical visualization (e.g. rendered graphical visualization). For example, the graphical visualization may include an image such as a 2D or 3D image of the hidden targets. In some cases, the images may include one or more of the target's and/or medium parameters such as size, width volume, etc.

In an embodiment, the 2D or 3D images may include an improved image quality of the hidden objects such as elongated objects or elements such as pipes, wires, etc., with an increased probability of detection of such elements, and ability to estimate their parameters (e.g. orientation, radius).

According to one embodiment, there is provided a device comprising a MIMO (multiple input multiple output) sensing module for detecting and/or imaging one or more target objects embedded within a non-homogenous medium such as a non-homogenous wall. In an embodiment the MIMO sensing module may include an antenna array comprising a plurality of antennas/sensors, the antennas/sensors are configured to produce a set of measurements.

In one embodiment the device comprises an array, the array comprises at least two transducers, wherein at least one of said at least two transducers are configured to transmit one or more signals towards at least one object embedded in a non-homogenous medium, and at least one transceiver attached to said at least two transducers, the at least one transceiver is configured to transmit at least one signal toward the at least one object and receive a plurality of signals affected by the object while the array is moved in proximity to the non-homogenous medium (e.g. in front of the wall, on the surface of the wall or few centimeters from the surface of the wall for example between 1-30 cm from the wall, or less).

In some embodiments, the one or more target objects may be or may include one or more pipes, wires or a plurality of layers or mirrors or surfaces.

In some embodiments, each transducer of the at least two transducers is an RF antenna.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1A is a simplified schematic diagram showing a user 120 scanning the surface of a non-uniform medium such as a non-uniform wall 140 by a mobile device 110. The medium may be made of two or more elements, for example, a solid element such as wood, stone, gypsum, concrete and non-solid elements such as air, water, or a combination thereof. In some cases, wall 140 may be a Lath & Plaster wall.

Figure 1B:
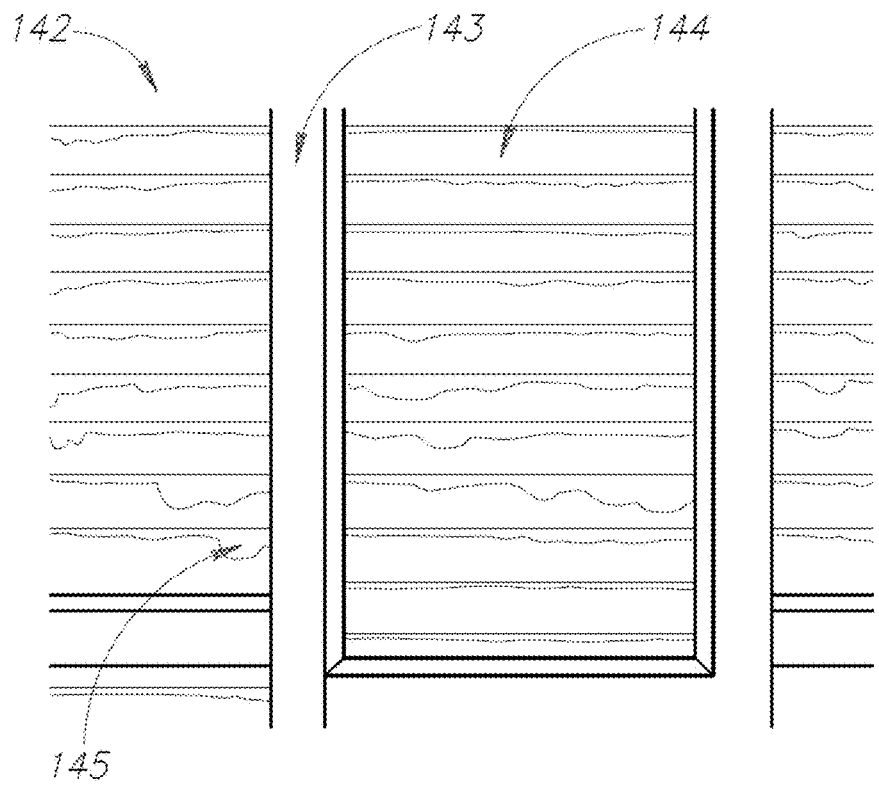
FIG. 1B shows the interior and outer elements of a lath and plaster wall, in accordance with the prior art.
Figure 1C:
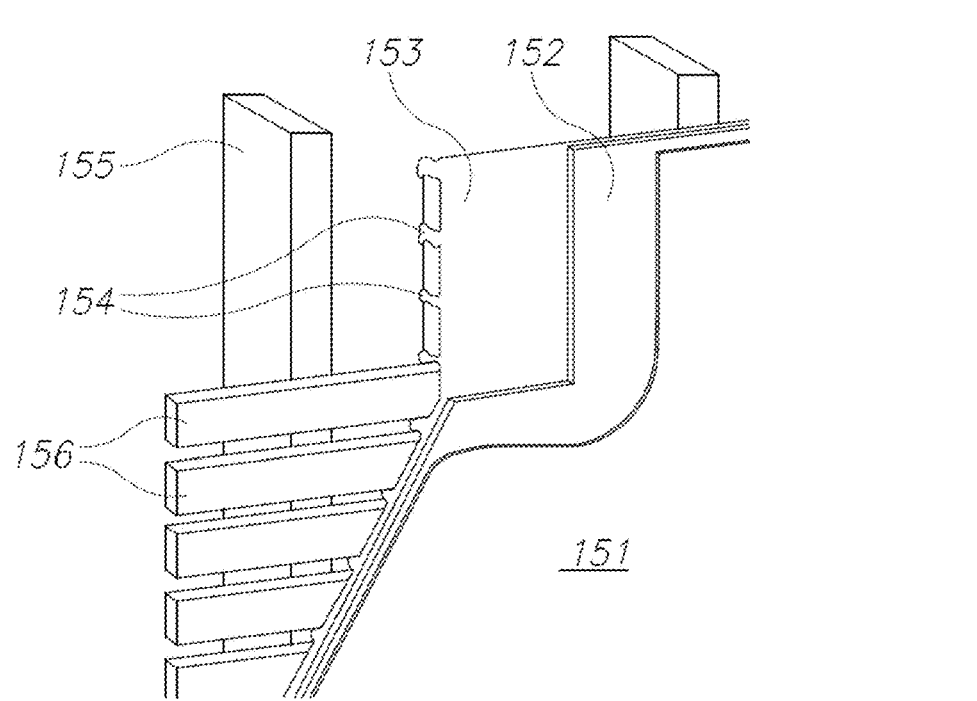
FIG. 1C shows various examples of different walls, in accordance with the prior art.

In some embodiments, the device may image the inside sections of the lath & plaster wall or other types of walls as shown in FIG. 1B and FIG. 1C, which are either a combination of drywall with lath & plaster (renovated walls), or a lath & plaster wall with tiles attached to a chicken mesh at its other side.

Specifically, FIG. 1B shows an image example of a back section of a non-uniform wall 142, i.e. lath & plaster (renovated wall). In accordance with embodiments, a device such as the mobile device 110 is configured to image the inner sections and/or elements behind the non-uniform wall 142 such as studs 143, and wood laths 144 which may be covered up to 10 cm, 15 cm, 20 cm deep and more by concrete or plaster 145. In some embodiments, the device may display users what is in or behind their wall in multiple modes (Pan mode, Image mode, and Expert mode).

In accordance with embodiments, the device may detect one or more elements covered by the plaster topcoat such as metal objects, wood studs, wires, pipes and the like.

FIG. 1C shows the structure of a lath & plaster wall 150 which popularity is mainly in the US. The wall 150 comprises plaster topcoat section 151, plaster second coat section 152, plaster base coat section 153, plaster keys 154, timber studs 155 and wood laths 156.

In some cases, the medium may be a multilayer medium, for example, a wall including more than two layers made of different types of materials. For example, the first layer may be made of plaster or wood and the second layer may be made of a second type of material such as plastic.

The mobile device 110 may be for example a communication mobile device such as a mobile phone comprising or connected to a sensing module 130, comprising an antenna array. For example, mobile device 110 may be a smartphone or a tablet as will be illustrated specifically in FIG. 3. In operation, the user 120 places the mobile device 110 in proximity to the wall for example in parallel to the wall (e.g. in front of the wall, on the surface of the wall or few centimeters from the surface of the wall for example between 1-30 cm from the wall, or less). Once the user 120 scans the wall, one or more hidden targets (objects) such as vertical rebars 122 and 123 embedded within the wall in front or in proximity to the mobile device may be detected and/or imaged and displayed to the user in real-time (or offline), for example on the display unit of the mobile device 110 or on external display units. In some cases, the image may include a 2D or 3D image of the targets including specific information of the target's parameters such as size, orientation, radius depth, location and distance with respect to the medium and/or the user 120 or the mobile device 110. In some cases, a complete image of the wall 140 and the internal objects embedded in the wall 140 may be identified and/or imaged and/or displayed.

In some cases, the image may be or may include a visualization such as a graphical visualization or a rendered graphical visualization of the target object including the target object's parameters such as size, orientation, distance from the medium, etc.

In some cases, the sensing module 130 (e.g. measurement unit or sensing device) may be in communication or attached to a processing unit and/or a display unit. For example, the user 120 may scan the surface of the wall by the sensing module 130 and the scanned data may be transmitted via wired or wireless connection to a database unit located for example on a cloud or at the mobile device 110 database and the scanned data may be processed by one or more external processing units or internal processing units (e.g. included in the mobile device 110).

Figure 2:
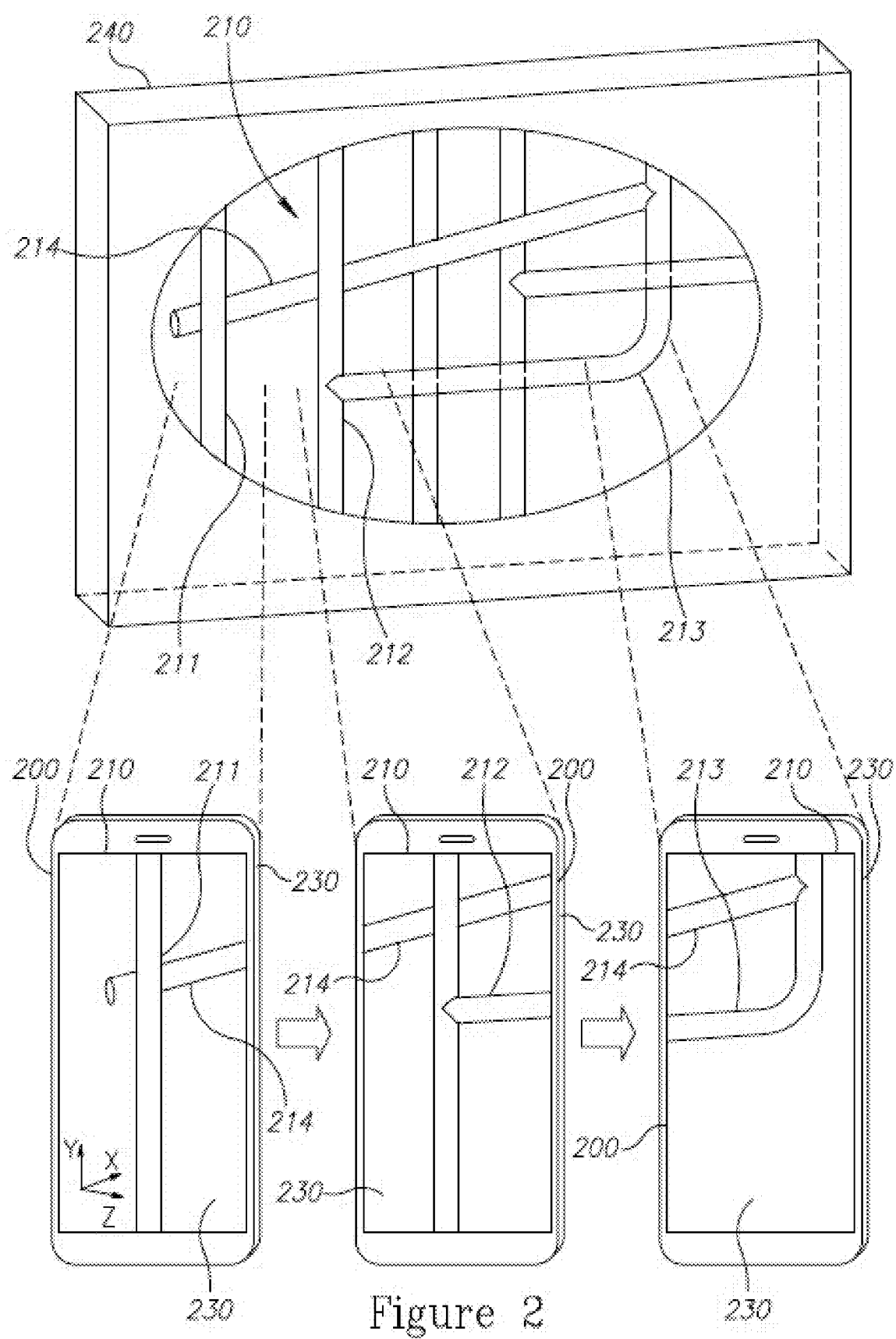
FIG. 2 is a simplified schematic diagram illustrating specifically a process for imaging one or more objects covered and hidden within a medium such as a wall, according to an embodiment of the invention.

FIG. 2 is a simplified schematic diagram illustrating specifically a process for imaging one or more target objects covered, embedded and hidden in or behind a medium such as a non-uniform wall, in accordance with embodiments. The target objects may be for example pipes such as elongated water pipes 211, 212 and 213 or electric wires 214 or studs embedded within a medium such as a wall 240. The wall 240 may be made of two or more materials such as wood, glass, plastic, gypsum, aluminum, iron, stone, or any combinations thereof. Specifically, in accordance with embodiments, the wall may be a lath & plaster wall.

In accordance with embodiments, the user may place a mobile device 200 (comprising or in communication with the sensing module the display unit and other units such as one or more processing units) on the wall and the target objects hidden in the wall may be uncovered and displayed on the display (e.g. the mobile device 200 display) for example, while the user scans the external surface of the wall. The images displayed to the user may be 2D or 3D images presenting the exact size and orientation of the hidden target objects. Specifically, the images include the portion of the target which is in proximity to the mobile device or the sensing unit. For example, as shown in FIG. 2 at step A (illustrated at the left bottom side of FIG. 2) the mobile device displays on a display 230 a portion 211 including the perpendicular section of a pipe 210 located at the left side of the wall and a portion of wire 214 and as the user scans the wall from left to right other portions of the pipe 210 are uncovered and displayed such as at step B portion 212 including the horizontal portion of the pipe is displayed and another portion of wire 214, and at step C the curve section 213 is uncovered and displayed to the user.

Figure 3:
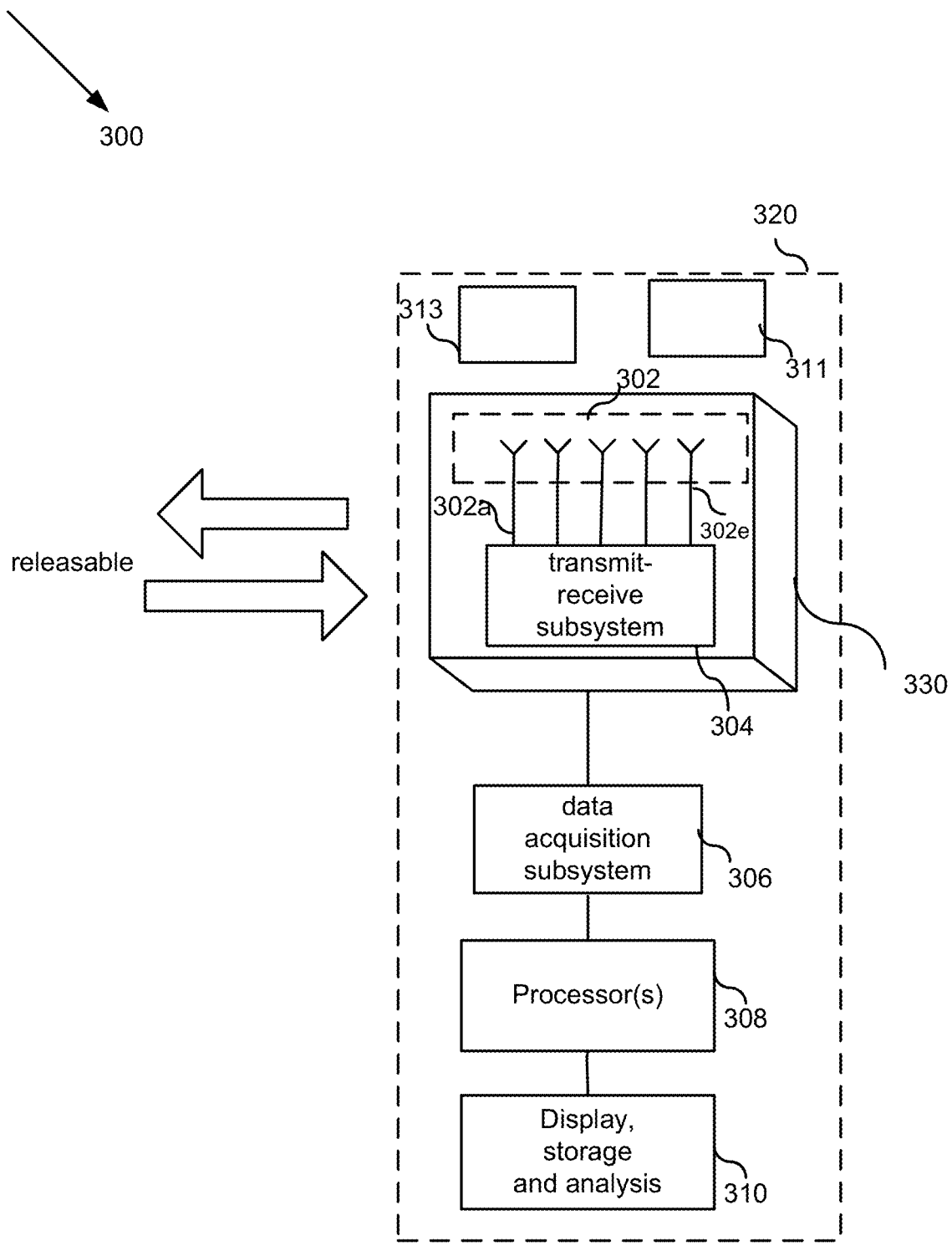
FIG. 3 is a schematic view of a sensing device, in accordance with embodiments of the invention.

FIG. 3 illustrates an imaging system 300 configured to sense and/or image one or more targets (e.g. objects) embedded within an object or medium, such as non-homogeneous medium in accordance with embodiments. The system 300 comprises a measurement module 330 configured to be attached or included in a device such as a portable device 320. According to some embodiments, the portable device 320 may be a handheld device or a handheld computer such as a mobile telephone, a smartphone (e.g. the mobile device 200 of FIG. 2), a tablet computing device, a laptop computing device, a personal digital assistant, a visible light camera, a personal video device, global positioning system navigational device, pager, portable gaming device or any other appropriate mobile device known in the art. For example, the measurement module 330 may be configured to capture, characterize, image, sense, process, and/or identify, or define a target (e.g. target objects) embedded and/or hidden within a non-uniform medium and provide an identification results relating to the medium to the portable device 320 for use in any desired fashion (e.g., for further processing, to store in memory, to display, to use by various applications running on the portable device 320, to export to other devices, or other uses).

In one embodiment, the measurement module 330 may be a multi-layer structure implemented at least in part with printed circuit board techniques using appropriate dielectric materials. Commonly used materials are glass-epoxy, Teflon-based materials. Layers of high-dielectric-constant materials can be incorporated in order to match the antennas to materials under test.

The measurement module 330 may include or may be connected to a transmit/receive subsystem 304, a data acquisition subsystem 306, one or more processors 308, and optionally to additional sensors such as accelerometer 311 an imager 313 and a display, storage and analysis subunit 310.

According to some embodiments, the measurement module 330 comprises an array, the array comprises one or more transducers (e.g. RF antennas), wherein at least one of said at least two transducers is configured to transmit a signal towards a medium or objects, and at least one transceiver attached to the transducers, the at least one transceiver is configured to transmit at least one signal toward the medium and receive a plurality of signals affected by the medium.

Specifically, the measurement module 330 may include one or more antennas such as antenna array 302. For example, the antenna array 302 may include multiple antennas 302a-302e typically between a few and several dozen (for example 30) antennas. The antennas can be of many types known in the art, such as printed antennas, waveguide antennas, dipole antennas or "Vivaldi" broadband antennas. The antenna array can be linear or two-dimensional, flat or conformal to the region of interest According to some embodiments, antenna array 302 may be an array of flat broadband antennae, for example, spiral-shaped antennae. The antenna array 302 may include a layer of matching material for improved coupling of the antenna radiation to the materials or objects under test. The unique and optimized shape of the antenna array enables their use in limited sized mobile devices, such as a thin, small-sized smartphone or tablet. In addition, the use of an antenna array made as flat as possible, for example in a printed circuit, allows for the linkage of the measurement module 330 to any mobile device known in the art, as it does not take up much space in the mobile device, it is not cumbersome, nor does it add significant weight to the portable device 320.

In some cases, the measurement module 330 may be a standalone unit, for example, attached to or connected to a computer device via wired or wireless connections such as USB connection or Bluetooth™ or any electronic connection as known in the art.

The transmit/receive subsystem 304 is responsible for the generation of the microwave signals, coupling them to the antennas 302a-302e, reception of the microwave signals from the antennas and converting them into a form suitable for acquisition. The signals (e. g. multiple sets of RF signals) can be pulse signals, stepped-frequency signals, chirp signals and the like. The generation circuitry can involve oscillators, synthesizers, mixers, or it can be based on pulse oriented circuits such as logic gates or step-recovery diodes. For example, these signals may be microwave signals in the UWB band 3-10 Ghz (having a wavelength of 3-10 cm in air). The conversion process can include down-conversion, sampling, and the like. The conversion process typically includes averaging in the form of low-pass filtering, to improve the signal-to-noise ratios and to allow for lower sampling rates. The transmit/receive subsystem 304 can perform transmission and reception with multiple antennas at a time or select one transmit and one receive antenna at a time, according to a tradeoff between complexity and acquisition time.

In some embodiments, the sensing system may include MIMO (multiple-input and multiple-output) arrays in the microwave region.

The data acquisition subsystem 306 collects and digitizes the signals from the transmit/receive subsystem 304 while tagging the signals according to the antenna combination used and the time at which the signals were collected. The data acquisition subsystem will typically include analog-to-digital (A/D) converters and data buffers, but it may include additional functions such as signal averaging, correlation of waveforms with templates or converting signals between frequency and time domain.

The data acquisition subsystem 306 may include a Radio Frequency Signals Measurement Unit (RFSMU) such as a Vector Network Analyzer (VNA) for measuring the received/reflected signals.

In accordance with embodiments, the one or more processors 308 are responsible for converting the collected signals into a set of responses characterizing the medium and the target objects, using for example Delay and Sum method and generating sets of 3D images (e.g. DAS images).

The one or more processors 308 are further responsible for processing the set of DAS images to detect the target objects, in accordance with embodiments. More specifically, the one or more processors are configured and enabled to acquire multiple sets of RF signals from multiple transmit antennas; convert each set of RF signals of the multiple sets of RF signals into a DAS (Delay and Sum) image of the medium using a DAS processing method to yield a plurality of DAS images; optionally stitch the plurality of DAS images to yield a composite image; analyze the composite image or the plurality of DAS images to detect one or more targets in said composite image.

According to some embodiments, the system may include an accelerometer 311 to fine-tune and give additional data with respect to the movement, the distance of the device.

Additionally, the device may include an imager 313 to obtain the device relative location or movement with respect to a reference location, as will be illustrated in detail hereinabove.

A final step in the process is making use of the resulting parameters or image, either in the form of visualization, display, storage, archiving, or input to feature detection algorithms. This step is exemplified in FIG. 3 as display storage and analysis 310. The console for example in a mobile device is typically implemented as a handheld computer such as a mobile telephone or a tablet with appropriate application software.

According to system type, the computer can be stationary, laptop, tablet, palm or industrial ruggedized. It should be understood that while FIG. 3 illustrates functional decomposition into processing stages, some of those can be implemented on the same hardware (such as a common processing unit) or distributed over multiple (such as graphical processing unit, GPU) and even remote pieces of hardware (such as in the case of multiprocessing or cloud computing).

According to one embodiment, subsystems 306, 308 and 310 may be part of the measurement module 330 or the portable device 320, as shown in FIG. 3. Alternatively, the measurement module 330 may be included within a housing such as a case or a jacket configured to be releasable (i.e. connected or disconnected) to the portable device 320. For example, the measurement module 330 may include the antenna array unit 302 and the transmit/receive-subsystem 330 may be part of the housing which is electrically or wirelessly connected to the portable device 320, for example, through a dedicated connection such a USB connection, wireless connection or any connection known in the art.

Following the connection of the measurement module 330 to the portable device, the measurement module 330 may utilize the portable device's own data acquisition, data processing display, storage and analysis subsystems.

Figure 4A:
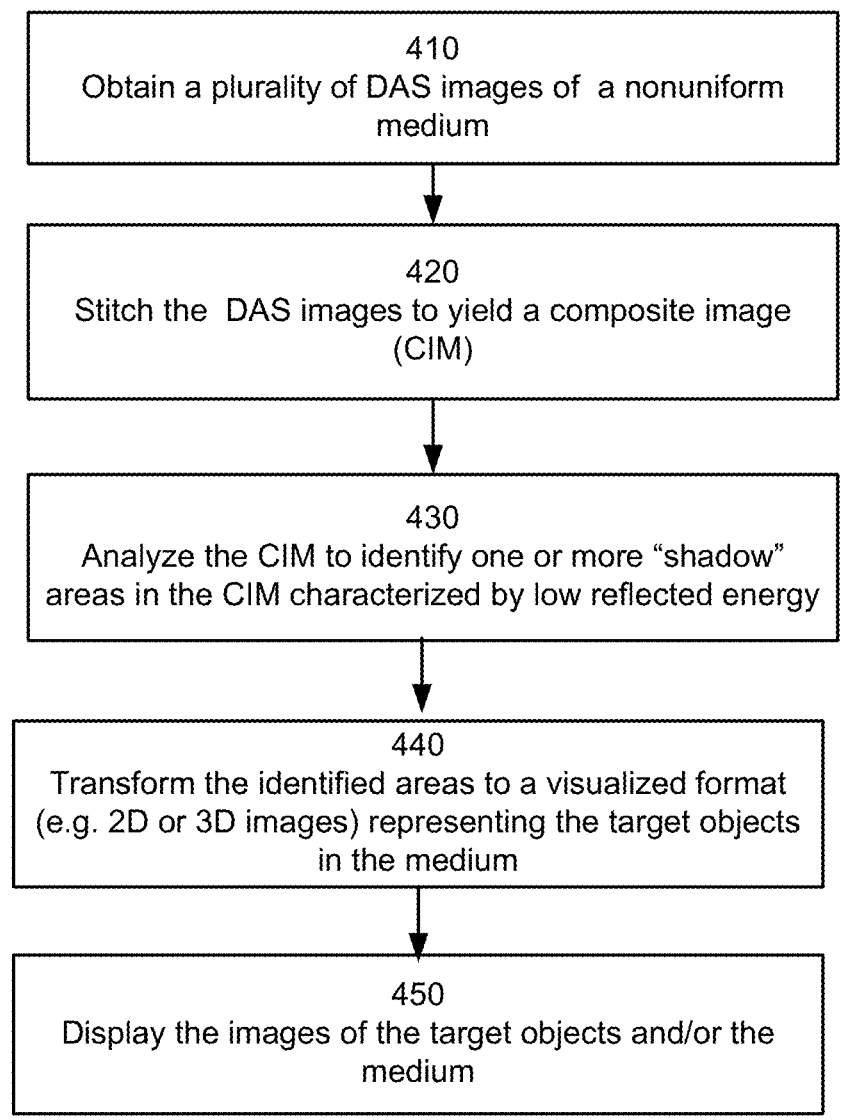
FIG. 4A is a flowchart illustrating a method for imaging one or more targets located in a medium, in accordance with embodiments of the invention.

FIG. 4A is a flowchart 400 illustrating high-level steps of a method for detecting and/or imaging one or more objects (e.g. target objects) located or embedded within a nonuniform medium, in accordance with embodiments. At step 410 a plurality of images such as DAS images of a nonuniform medium are obtained, for example at one or more processors such as the one or more processors 308. In some cases, the images are captured by scanning the nonuniform medium using a sensing device such as sensing device 300. Specifically, the plurality of images such as DAS images are generated by acquiring multiple sets of RF signals from multiple transmit antennas and converting each set of RF signals of said multiple sets of RF signals into the DAS (Delay and Sum) image of the medium using DAS processing method to yield the plurality of DAS images.

In accordance with embodiments, each DAS image is a 3D localized representation of the medium as captured by the sensing device at a specific location. The plurality of DAS images are captured by moving the sensing device and scanning the medium (e.g. the wall) at different locations, for example along the wall's horizontal trajectory.

Optionally, to identify one or more energy threshold values the following steps 420 and 430 are performed. Alternatively, to obtain the one or more energy threshold a calibration process is performed as for example illustrated in FIG. 5A.

At step 420 the plurality of DAS images are stitched one to the other to generate a composite image of the medium (hereinafter CIM). Specifically, the stitching process comprises concatenating or summing the images while considering the position of the sensing device while scanning the medium and acquiring the DAS images.

As typically the DAS images are generated from adjacent positions of the sensing device (causing overlapping regions of the medium to be scanned) the images may be summed over the appropriate overlapping points, using one or more summation methods as known in the art. The summation can be either coherent or incoherent, with the coherent summation of images being the preferred method. According to some embodiments, the coherent summation is provided by coherent summation of RF signals (e.g. multiple sets of RF signals) reflected from the medium (or object targets within the medium) and by measuring the delays obtained via a geometrical ray tracing model.

At step 430 the composite image comprising a plurality of DAS images (e.g. CIM) or the plurality of DAS images are analyzed to identify one or more areas in the image, such as "shadow" shape or "shadow trail" shape, areas characterized by relative low reflected energy level, for example, image areas comprising reflected relative low energy level in comparison with the energy level of other areas in the image.

There are multiple methods in which one can extract the energy level of the shadow, in accordance with embodiments. For example, singular values decomposition (SVD) can be performed for each DAS image, whereas the dominant value represents the energy value in the image. Another method that produces similar results comprises calculating multiple energy snapshots of by summing the reflected energy along Z axis with respect to X-Y-Z Cartesian axis in a preselected interval $[z_0, z_n]$, according to Eq (1):

$$E_{snapshot_{xy}} = \sqrt{\sum_{z=z_0}^{z_n}(|CIM_{xyz}|)^2} \qquad (1)$$

An energy snapshot is identified as shadow if the energy obtained in Eq (1) satisfies the threshold of Eq (2)

$$E_{shadow} < \alpha \frac{\sum_{i=1}^{m} E_{snapshot_{xy_i}}}{m} \qquad (2)$$

where m is the number of snapshots averaged and $\alpha$ can be obtained for example by known statistical analysis methods.

In some embodiments, the analysis of step 430 optionally includes normalizing the plurality of DAS images according to the DAS image (of the plurality of DAS images) which includes the largest energy level.

Figure 4B:
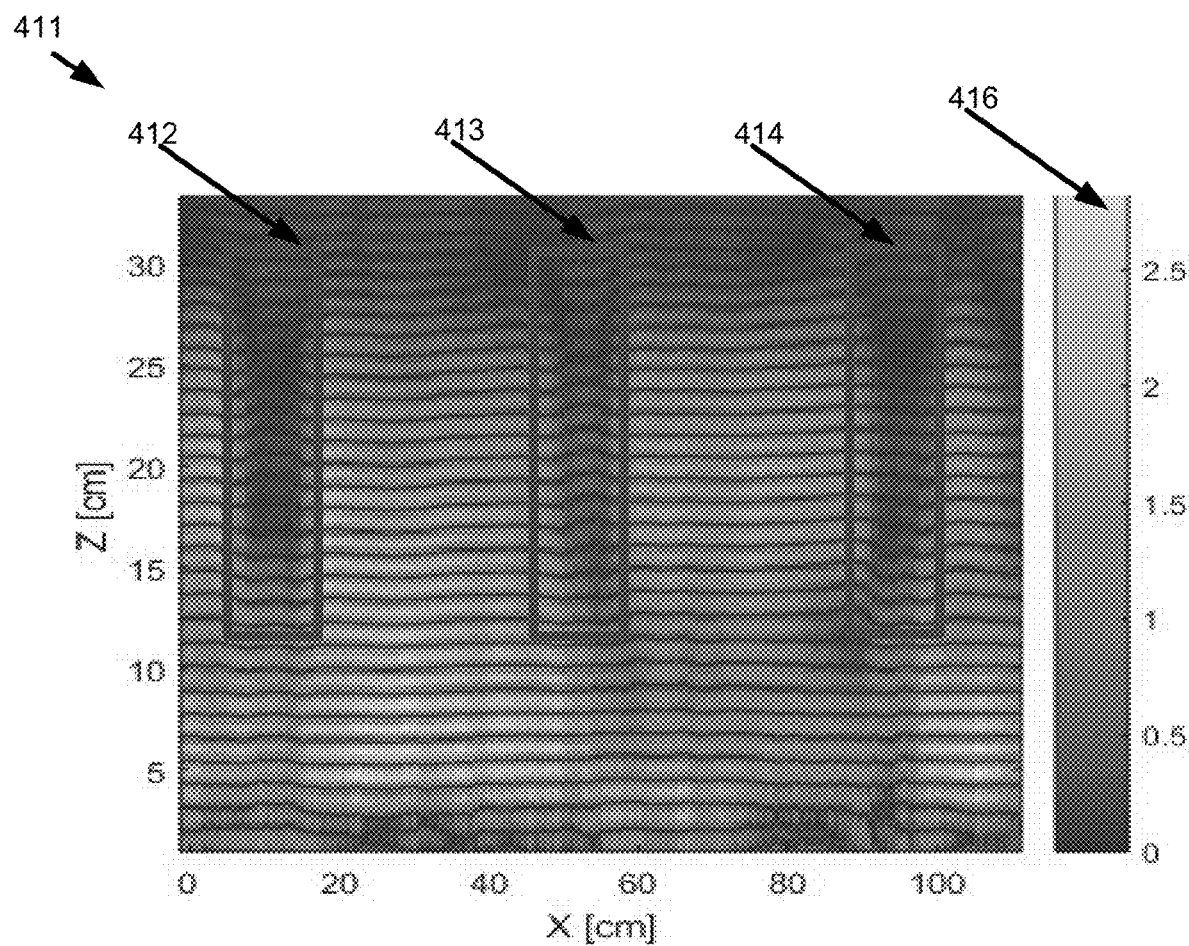
FIG. 4B shows an example of composite images (CIM) of a nonuniform wall, in accordance with embodiments.

An example of a composite image (CIM) 411 is illustrated in FIG. 4B. In accordance with embodiments, CIM 411 represents energy levels of coherently summed DAS images resulting from scanning along 100 cm a nonuniform wall having a thickness of around 10-15 cm. Accordingly, the X-axis of CIM 411 represents the horizontal dimension, while the Z-axis represents the wall thickness dimension. The energy level is presented by a color scale column (e.g. grayscale) where dark color corresponds to low energy level and bright color to high energy level. FIG. 4B shows three "shadow trails" areas 412, 412 and 414 which are identified as target objects within the nonuniform wall and accordingly includes measured low energy with respect to measured energy threshold, while the other areas are identified as the wall which were identified as high energy level with respect to measured energy threshold. For example, to detect the shadow areas 412, 413 and 414 energy snapshots are calculated by summing the energy in the Z direction from $z_0=15$ cm, $z_n=30$ cm as per Eq (1) above.

At step 440 the identified "shadow trails" areas are transformed to a visualized format, such as one or more 2D or 3D images representing the detected target objects and the accurate image of the target and/or the medium and their location.

Optionally, at step 450 the images of the identified targets are displayed, for example on the user's mobile device display. In some embodiments, the target objects are visualized according to methods included in the present applicant U.S. patent application Ser. No. 15/569,480 entitled "SYSTEM, DEVICE AND METHOD FOR IMAGING OF OBJECTS USING ELECTROMAGNETIC MODELING" which is incorporated herein by reference".

Figure 5A:
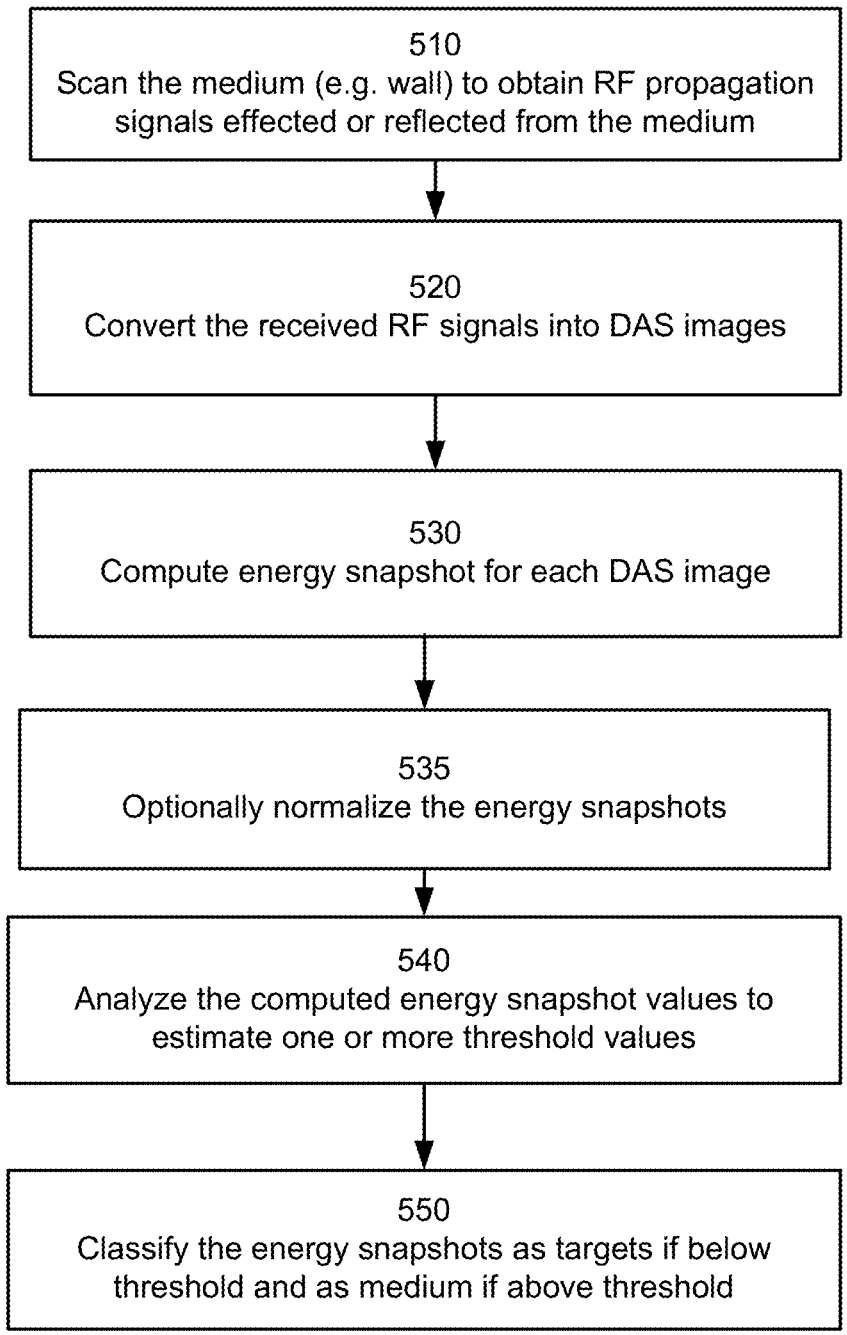
FIG. 5A is a flowchart illustrating a calibration method required for detecting and/or imaging one or more objects (e.g. target objects) located or embedded within a nonuniform medium, in accordance with other embodiments.

FIG. 5A is a flowchart 500 illustrating a method for calibrating the device to yield one or more threshold values (medium dependent) for detecting and/or imaging one or more objects (e.g. target objects) located or embedded within a nonuniform medium, in accordance with embodiments.

At step 510 the medium (e.g. the wall) is scanned. Specifically, in accordance with embodiments, the calibration process includes scanning the medium using a sensing device, such as the RF sensing device 300 shown in FIG. 3, to receive RF signals (e.g. multiple sets of RF propagation signals) effected or reflected from the medium.

At Step 520 the received RF signals are converted according to methods known in the art to a plurality of DAS images.

At step 530 a process is performed to generate one or more values (e.g. energy snapshots), for each DAS image of the plurality of DAS images. These values are used, in accordance with embodiments, to obtain one or more energy threshold values. Specifically, at step 530 each DAS image, e.g. image j, which was generated as part of the calibration scanning is mapped into one or more energy values, e.g. $E_{snapshot_j}$ where $E_{snapshot_j}$ are energy snapshots computed according to Eq (3) shown below which includes summing the energy of the image for example in the Z (depth/thickness) direction over a predetermined range of Z and averaged over the X and Y range of the DAS image as follows:

$$E_{snapshot_j} = \sqrt{\Sigma_{x=x_0}^{x_l} \Sigma_{y=y_0}^{y_m} \Sigma_{z=z_0}^{z_n}(|DAS_{xyz}|)^2} \quad (3)$$

Optionally at step 535, the energy snapshots may be normalized. Specifically, the maximal energy snapshot value, $\max(E_{snapshot_{j=1}^n})$ is used as the normalization factor, e.g.

$$\frac{E_{snapshot_j}}{\max(E_{snapshot_{j=1}^n})} \quad (4)$$

At step 540 the computed energy snapshots are analyzed to estimate one or more energy threshold values. In some cases, the computed energy snapshots are converted, for example to one or more graphs which are analyzed to estimate one or more energy threshold values. The one or more energy threshold values (medium dependent) are used, in accordance with embodiments, to distinguish between non-target areas (e.g. medium material such as a brick, concrete, plaster and the like) and target objects (e.g. pipes, studs and the like) within the medium (e.g. wall).

Figure 5B:
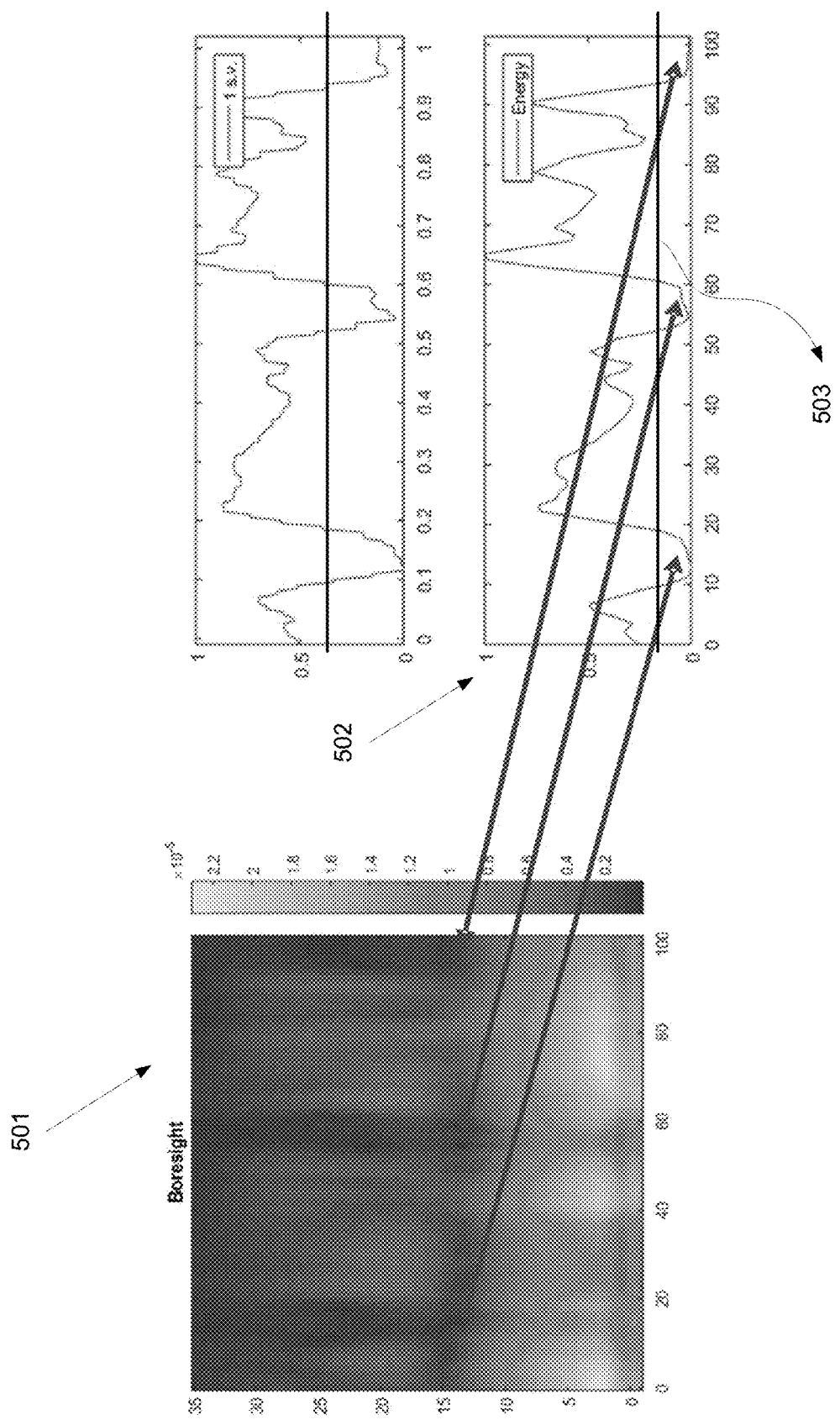
FIG. 5B shows an example of energy summation images over snapshots of DAS images which may be analyzed to yield one or more graphs to define the scanned medium energy threshold, in accordance with embodiments.

An example of the calibration process of FIG. 5A is shown in FIG. 5B. Specifically, FIG. 5B illustrates a coherent summation of DAS images 501 (e.g. CIM) which is processed to compute energy snapshots (e.g. for each DAS image of the coherent summation of DAS images 501) to yield graph 502. In accordance with embodiments, graph 502 is further analyzed to estimate the scanned medium energy threshold 503. Accordingly, each point along the X-axis of graph 502 represents the energy snapshot obtained for the DAS image at that point along X-axis.

More specifically, in the example shown in FIG. 5B, three areas in the composite image (CIM) 501 are identified below the energy threshold 503 and accordingly are identified as potential target objects. In some cases, the calculated energy threshold is presented as a dimensionless parameter normalized by $\max(E_{snapshot_{j=1}^n})$ At step 550 each image or portion of the image (e.g. image pixels) is classified as target or medium according to the identified energy threshold. For example, a DAS image may be binary classified according to Eq (5) as a target object when its snapshot energy is below threshold and as a medium otherwise.

$$E_{target} = E_{shadow} < \alpha \frac{\sum_{k=1}^{m} E_{snapshot_k}}{m} < E_{Medium} \quad (5)$$

For example, as shown in FIG. 5B DAS images captured around 20 cm, 60 cm and 100 cm of the medium (in respect to medium scanned along 100 cm) are below the energy threshold and accordingly identified as target objects.

Figure 5C:
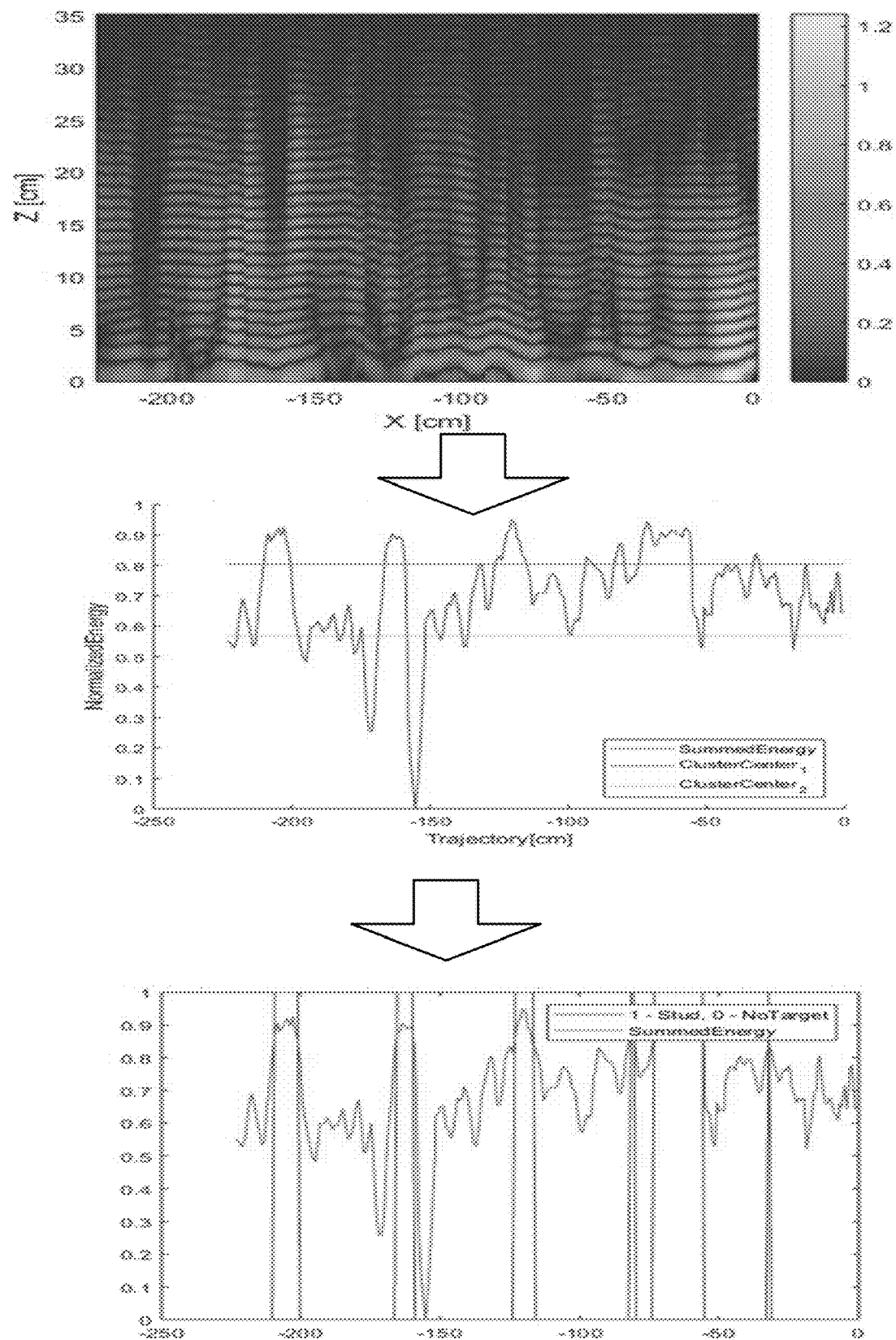
FIG. 5C illustrate other methods for measuring an energy threshold parameter based on energy summation of image snapshots of a medium, in accordance with embodiments.

FIG. 5C illustrates another method for measuring an energy threshold parameter based on energy summation of image snapshots of a medium, in accordance with embodiments. This method includes converting measured energy summation of the medium snapshots to one or more graphs. The graphs are further analyzed to detect two cluster centers, where each cluster represents accordingly targets and medium. Thus, two thresholds are generated: deciding target according to threshold of Eq (6) and deciding medium according to threshold of Eq (7):

$$E_{target} = E_{shadow} < \alpha \frac{\sum_{k=1}^{m} E_{snapshot_k}}{m} \quad (6)$$

$$E_{Medium} > \beta \frac{\sum_{k=1}^{m} E_{snapshot_k}}{m} \quad (7)$$

In some cases, the graphs may be further converted to an inverse graph (or 1-X) to provide a more accurate threshold parameter.

Figure 6A:
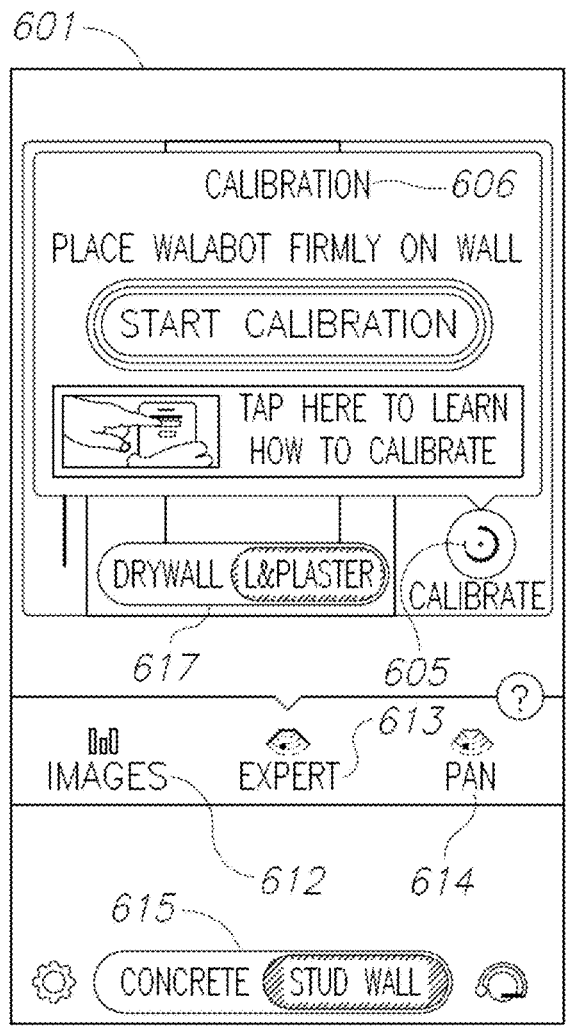
FIG. 6A and FIG. 6B are schematic representations of a user interface screenshot, as displayed for example on a user's display, in accordance with embodiments.
Figure 6B:
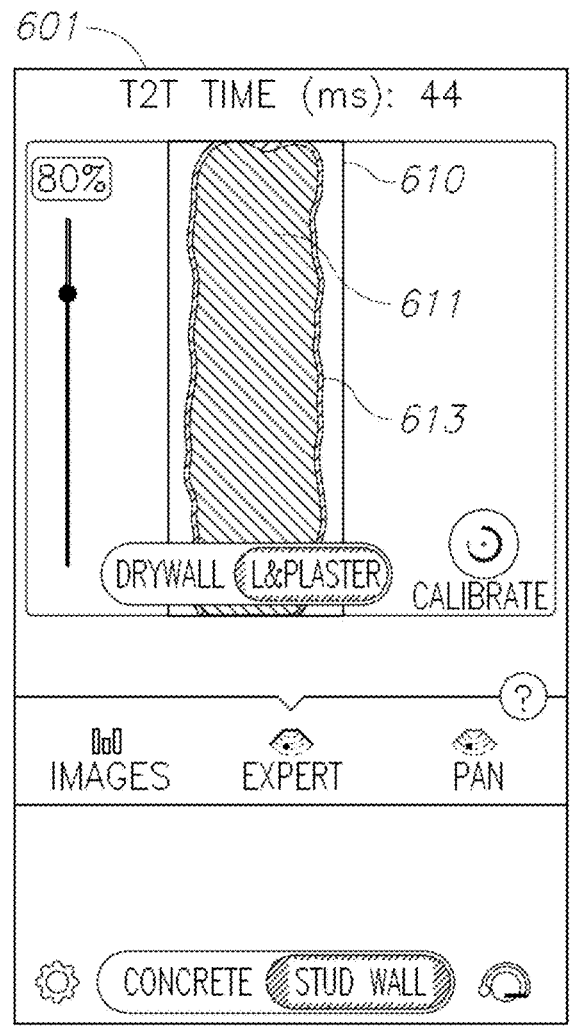

FIG. 6A and FIG. 6B show respectively schematic representations of user interface screenshots 601 and 602, as displayed for example on a user's display (e.g. user's mobile device display) in accordance with embodiments. FIG. 6A shows an example of a screenshot image 601 of the user interface before the scanning process starts, while FIG. 6B shows an example of a screenshot image of the user interface 602 including display results of an L&P scanned wall such as a 2D DAS image 610 of a target object identified within the L&P wall.

In many embodiments, the user may download a user application (e.g. Walabot © DIY app) for example via a cloud server to his mobile device.

In many embodiments, a processor, such as the one or more processors 308 comprise instructions of a user application downloaded onto the mobile communication device and wherein the mobile communication device comprises a smartphone coupled to a sensing device with a wireless communication protocol.

In many embodiments, the one or more processors 308 comprise instructions to display a message on the communication device including an update to the user that the communication device is waiting for the user to select a type of wall (L&P wall or drywall) and to scan the wall.

In many embodiments, the processor comprises instructions to display one or more controls on the mobile communication device.

In many embodiments, the processor comprises instructions to display one or more user-selectable applications for the user to operate the sensing device (e.g. the measurement module 330).

In another aspect, a device to detect one or more target objects within a wall such as inhomogeneous wall comprises a processor (such as the one or more processors 308) comprising a tangible medium embodying instructions of an application. The application can be configured to couple a mobile communication device to a sensing device such the measurement module 330 to identify and image one or more target objects within the wall.

In some cases, the user application may include a calibration control button 605.

In some cases, once activating the calibration button 605 a popup display screen image 606 including detailed explanations to the user how to calibrate his device is presented. The explanations may include details such as where and how to place the sensing device on the wall. In some cases, the user may tap the popup display to receive more details on how to calibrate his device.

In many embodiments, the user application may include a selection button 615 configured and enabled for accordingly selecting between two types of mediums (e.g. walls) to be scanned, e.g. concrete wall or stud wall. Additionally, in some cases, the user may further select by pushing button 617 between scanning a drywall and a L& Plaster wall. Methods and systems for scanning and identifying objects within a drywall were illustrated by the present applicant patents such as U.S. Pat. No. 10,566,699 entitled "SYSTEM AND METHOD FOR RADIO FREQUENCY PENETRATION IMAGING OF AN OBJECT". Accordingly, the methods and devices for imaging with a homogenous wall such as a drywall do not require a calibration process as illustrated in the present invention.

In many embodiments, the user application may include a 'PAN' button 614 for presenting panoramic images of the target objects within the wall, and 'IMAGES' button 612 for visualizing the identified target objects within the wall. The visualization may include presenting the shape and size of the identified objects on the display.

In many embodiments, the user application includes an 'EXPERT' button 613 for displaying a colored presentation of the identified one or more target objects within the L&P wall as illustrated in FIG. 6B. For example, as illustrated in FIG. 6B each pixel within the 2D DAS image 610 of the target object identified within the L&P wall can be either red or white, where red color (illustrated in diagonal lines 611) represents relative low energy below threshold and accordingly a target object while white color 613 represents energy above this threshold. i.e. wall. By looking at this image, the user may identify a target when the entire screen becomes red i.e., a shadow.

Figure 7:
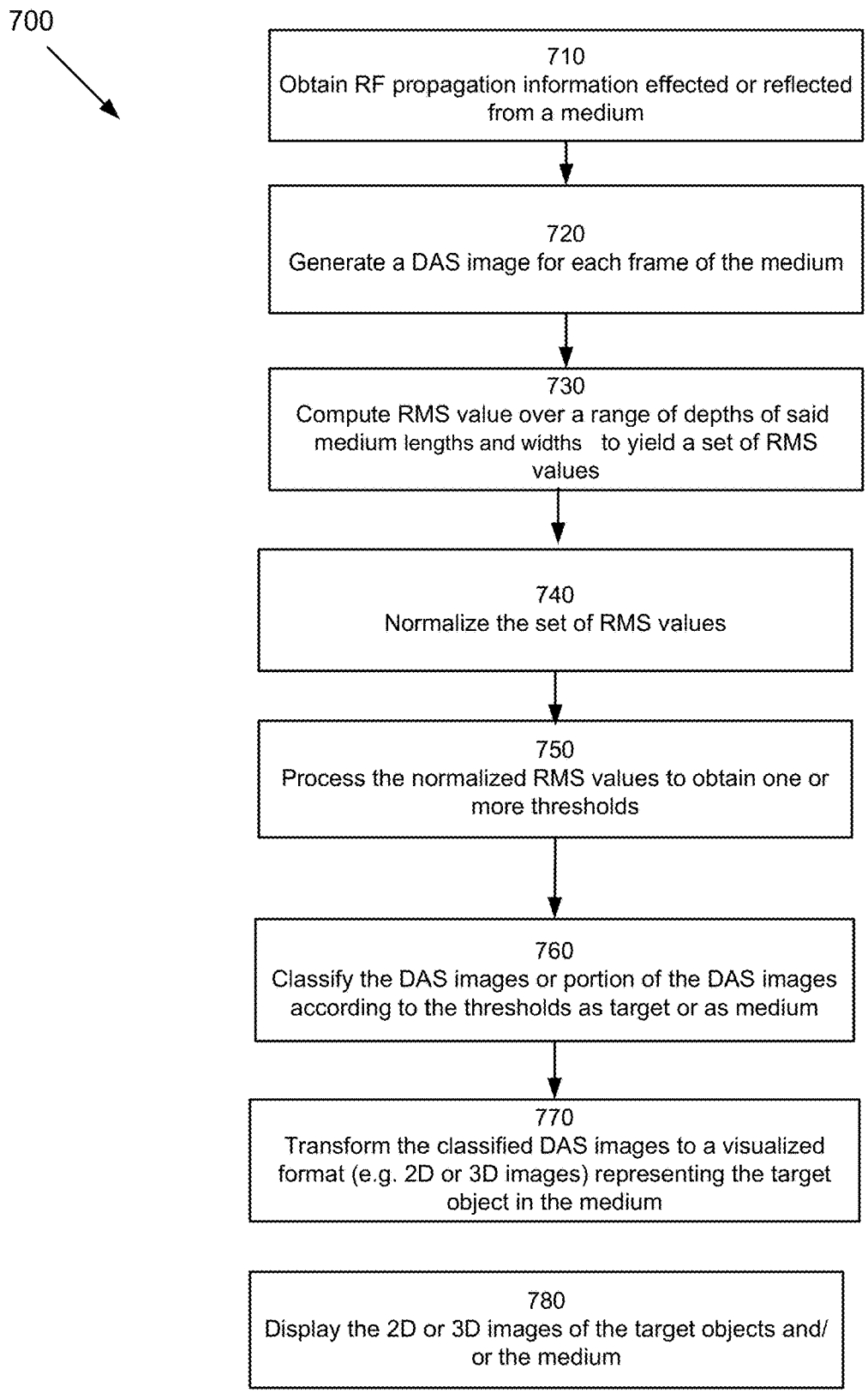
FIG. 7 is a flowchart of a method for identifying one or more target objects hidden within or behind a nonuniform medium such as a nonuniform wall, in accordance with embodiments.

FIG. 7 shows detailed steps of a method 700 for identifying one or more target objects hidden within or behind a nonuniform medium such as a nonuniform wall, in accordance with embodiments.

At step 710 RF propagation information affected or reflected from the medium (e.g. nonuniform medium) is obtained. In some cases, the RF propagation information may include a matrix of frequency*antenna pairs phasors.

At step 720 a DAS image is generated, for example for each frame of the medium. For example, as shown in FIG. 1A the medium is scanned along the XY axis of a cartasian X-Y-Z axis and a DAS image of a medium frame (comprising N voxel values) corresponds to an XY area of, for example, around 0.5 cm*2 cm is generated.

At step 730 an RMS (root mean square) value over a range of depths (e.g. 15-30 cm) of the medium's lengths and widths is computed for each DAS image to yield a set of RMS values. For example an energy snapshot is computed according to Eq (8):

$$E_{snapshot_j} = \sqrt{\Sigma_{x=x_0}^{x_l} \Sigma_{y=y_0}^{y_m} \Sigma_{z=z_0}^{z_n} (|DAS_{xyz}|)^2} \quad (8)$$

At step 740 the set of RMS values are optionally normalized for example to 1, according to the DAS image including the maximum energy.

$$\frac{E_{snapshot_j}}{\max\left(E_{snapshot_{j=1}^n}\right)} \quad (9)$$

At step 750 the normalized RMS values are used obtain a threshold. For example, one optional way to estimate the threshold is to calculate the mean energy on the recorded measurements:

$$\frac{\sum_{j=1}^{m} E_{snapshot_j}}{m} \quad (10)$$

Denoting $\alpha$ and $\beta$ such that:

$$E_{target} < \alpha \frac{\sum_{j=1}^{m} E_{snapshot_j}}{m} \quad (11)$$

$$E_{Medium} > \beta \frac{\sum_{j=1}^{m} E_{snapshot_j}}{m} \quad (12)$$

two threshold values computed: one for detecting the target (Eq. 11) and the other for detecting the medium (Eq. 12). The values $\alpha$, $\beta$ used to determine the thresholds are found by using for example statistical analysis methods. Another method may use a single threshold value with a binary decision.

At step 760 the DAS images are classified as target or medium based on the measured threshold. If the energy of a new snapshot satisfies the condition (13) below, then this snapshot is most likely a target.

$$E_{snapshot} < \alpha \frac{\sum_{j=1}^{m} E_{snapshot_j}}{m} \quad (13)$$

And if the energy of a new snapshot satisfies the condition (14) below, it is most likely a medium.

$$E_{snapshot} > \beta \frac{\sum_{j=1}^{m} E_{snapshot_j}}{m} \quad (14)$$

At step 770 the classified DAS images may be transformed into a visualized format such as 2D or 3D images representing the target object. A pixel in the 2D image that satisfy criterion (13) (e.g. target) is colored for example in red and a pixel that satisfies criterion (14) (e.g. medium) is colored for example in white.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM).

In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for imaging at least one target object within a non-homogeneous medium, the method comprising:
   acquiring multiple sets of RF signals from multiple transmit antennas;
   converting each set of RF signals of said multiple sets of RF signals into a DAS (Delay and Sum) image of the non-homogeneous medium using a DAS processing method to yield plurality of DAS images;
   stitching the plurality of DAS images to yield a composite image (CIM), wherein said stitching comprises coherent summation of DAS images over overlapping regions in the DAS images;
   analyzing the CIM to yield one or more energy threshold values, said analysis comprising:
   identifying the energy level of each DAS image of the CIM by performing for each DAS image of the CIM a singular values decomposition (SVD), wherein a dominant value represents an energy level in the DAS image, or by calculating multiple energy snapshots of the CIM by summing reflected energy along a Z-axis with respect to a X-Y-Z cartesian axis;
   analyzing said plurality of CIM to detect one or more images comprising an energy level lower than said one or more energy threshold values; and
   identifying said detected one or more images as images of said at least one target object; and
   visualizing said at least one target object,
   wherein said multiple energy snapshots E_(snapshot_xy) are calculated in a preselected interval [z_0,z_n], according to Eq (1):

$$E_{snapshot_{xy}} = \sqrt{\Sigma_{z=z_0}^{zn}(|CIM_{xyz}|)^2} \quad (1)$$

wherein an energy snapshot is identified as target (E_shadow) if the energy obtained in Eq (1) satisfies the threshold of Eq (2):

$$E_{shadow} < \alpha \frac{\sum_{i=1}^{m} E_{snapshot_{xy_i}}}{m} \quad (2)$$

where m is the number of snapshots averaged.

2. The method of claim 1, comprising displaying said one or more images on a display.

3. The method of claim 1, wherein said one or more images are 2D (two dimensional) or 3D (there dimensional).

4. The method of claim 1, wherein said non-homogeneous medium is made of at least two different substances, each of said at least two substances are selected from the group consisting of:
   plaster, stone, concrete, gypsum, iron, plastic wood, glass, plastic, lath, gypsum, aluminum, iron, stone, air, or combinations thereof.

5. The method of claim 1, wherein said non-homogeneous medium is a wall.

6. The method of claim 5, wherein said non-homogeneous wall is a lath and plaster wall.

7. The method of claim 1, comprising displaying said at least one target object.

8. The method of claim 1, wherein said multiple sets of RF signals are acquired from an RF sensing device.

9. An RF (Radio Frequency) device, the device comprising:
   an RF array, the RF array comprises at least two transducers, wherein at least one of said at least two transducers is configured to transmit an RF signal towards at least one object embedded in a non-homogeneous medium, and at least one transceiver attached to said at least two transducers, the at least one transceiver is configured to transmit at least one RF signal toward the at least one object and receive multiple sets of RF signals affected or reflected by the at least one object or the non-homogeneous medium while the RF array is moved in proximity to the non-homogeneous medium;
   at least one analog-to-digital (A/D) converter and at least one data buffer configured to receive and store said multiple sets of affected RF signals; and
   at least one processor configured to:
   convert each set of RF signals of said multiple sets of RF signals into a DAS (Delay and Sum) image of the non-homogeneous medium using a DAS processing method to yield plurality of DAS images;
   stitching the plurality of DAS images to yield a composite image (CIM), wherein said stitching comprises coherent summation of DAS images over overlapping regions in the DAS images;
   analyzing the CIM to yield one or more energy threshold values, said analysis comprising:
   identifying an energy level of each DAS image of the CIM by performing for each DAS image of the CIM a singular values decomposition (SVD), wherein a dominant value represents the energy value in the image, or by summing the reflected energy along Z axis with respect to an X-Y-Z cartesian axis;

analyzing said CIM to detect one or more images comprising an energy level lower than said one or more energy threshold value; and identifying said detected one or more images as images of said at least one target object;

visualize said at least one target object, wherein said multiple energy snapshots E_(snapshot_xy) are calculated in a preselected interval [z_0,z_n], according to Eq (1):

$$E_{snapshot_{xy}} = \sqrt{\Sigma_{z=z_0}^{z_n}(|CIM_{xyz}|)^2} \quad (1)$$

wherein an energy snapshot is identified as target (E_shadow) if the energy obtained in Eq (1) satisfies the threshold of Eq (2):

$$E_{shadow} < \alpha \frac{\sum_{i=1}^{m} E_{snapshot_{xy_i}}}{m} \quad (2)$$

where m is the number of snapshots averaged.

10. The RF device of claim 9, comprising a display for displaying the image of said at least one object.

11. The RF device of claim 9, wherein the at least one object shape is selected from the group consisting of: an elongated object, a plane layer, a single point.

12. The RF device of claim 9, wherein the at least one object or the medium are made of one or more of: plaster, stone, concrete, gypsum, iron, plastic wood, glass, plastic, gypsum, aluminum, iron, stone, air, or combinations thereof.

13. The RF device of claim 9, wherein the RF device is configured to be in communication with a mobile device comprising the at least one processor and wireless communication circuitry to couple to the device, the at least one processor comprising instructions to receive data on said at least one target object and display the image of said at least one target object.

14. The RF device of claim 13, wherein said at least one processor unit and said display are located in said mobile device.

15. The RF device of claim 9, wherein each transducer of the at least two transducers is an RF antenna.

16. The RF device of claim 9, wherein the array is a Radio Frequency (RF) array and the at least two transducers are RF antennas configured to transmit the RF signals.

17. The RF device of claim 9, wherein the multiple sets of RF signals are selected from the group comprising of: pulses signals; stepped/swept frequency signals.

18. The RF device of claim 9, the plurality of signals bandwidth is within the UWB (3-10 Ghz) range or signals in the range between 1 Ghz and 100 Ghz.

* * * * *